(12) United States Patent
Jiang et al.

(10) Patent No.: US 11,082,880 B2
(45) Date of Patent: Aug. 3, 2021

(54) ADJUSTING DATA RATES IN WIRELESS NETWORKS

(71) Applicant: Hewlett Packard Enterprise Development LP, Houston, TX (US)

(72) Inventors: Yafeng Jiang, Beijing (CN); Guangzhi Ran, Beijing (CN); Qiang Zhou, Sunnyvale, CA (US); Jianpo Han, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/753,246

(22) PCT Filed: Oct. 27, 2017

(86) PCT No.: PCT/CN2017/108042
§ 371 (c)(1),
(2) Date: Apr. 2, 2020

(87) PCT Pub. No.: WO2019/080097
PCT Pub. Date: May 2, 2019

(65) Prior Publication Data
US 2020/0336932 A1    Oct. 22, 2020

(51) Int. Cl.
*H04W 28/02* (2009.01)
*H04B 17/345* (2015.01)
(Continued)

(52) U.S. Cl.
CPC ...... *H04W 28/0236* (2013.01); *H04B 17/345* (2015.01); *H04L 43/0823* (2013.01); *H04W 24/08* (2013.01)

(58) Field of Classification Search
None
See application file for complete search history.

(56) References Cited

U.S. PATENT DOCUMENTS 8,125,883 B2    2/2012    Aulin
8,213,867 B2    7/2012    Zhang et al.
(Continued)

FOREIGN PATENT DOCUMENTS

| CN | 101094164 | 12/2007 |
| CN | 102076070 | 5/2011 |
| WO | WO-2011134137 | 11/2011 |

OTHER PUBLICATIONS

Babu, M.G. et al.; "Evalulion of the Performance and Congestion-control in Wireless Mesh Networks"; Oct.-Dec. 2013; 8 pages.
(Continued)

*Primary Examiner* — Anh Ngoc M Nguyen
(74) *Attorney, Agent, or Firm* — Hewlett Packard Enterprise Patent Department

(57) ABSTRACT

An example wireless device, comprising: a radio system including an antenna, to receive receiver feedback information, the receiver feedback information being information collected by a receiver relating to receiving status of the receiver; a memory; and a processor executing instructions stored on the memory to: determine whether a level of noises and interferences associated with the receiver exceeds a predefined threshold based on the receiver feedback information; in response to determining that the level of noises and interferences associated with the receiver does not exceed the predefined threshold, obtain a revised data error ratio based on an original data error ratio and the receiver feedback information, the original data error ratio being a data error ratio collected by the wireless device; and adjust the data rate associated with the receiver based on the revised data error ratio.

15 Claims, 10 Drawing Sheets

(51) Int. Cl.
    *H04L 12/26*     (2006.01)
    *H04W 24/08*     (2009.01)

(56)         References Cited

U.S. PATENT DOCUMENTS 8,909,945 B2      12/2014  Rudolf et al.
    9,197,565 B2      11/2015  Khanchi et al.
    2010/0054143 A1*   3/2010  Kokku .................. H04B 7/022
                                                           370/252
    2012/0230678 A1    9/2012  In De Betou et al.
    2016/0066137 A1    3/2016  Kulkarni et al.
    2020/0045635 A1*   2/2020  Lin .................... H04L 27/2627

OTHER PUBLICATIONS

International Searching Authority, The International Search Report and the Written Opinion, dated Jun. 27, 2018, PCT/CN2017/108042, 9 Pgs.
Qualcomm Incorporated Rate-matching scheme for control channel 3GPP TSG-RAN WGI RAN1#90 RI-1713470 Aug. 25, 2017(Aug. 25, 2017), 9 Pgs.

* cited by examiner

ADJUSTING DATA RATES IN WIRELESS NETWORKS

BACKGROUND

In wireless networks, wireless data connections are used between wireless devices. A data rate may refer to the speed at which data is transferred upon the wireless data connections. The data rate can be measured in, for example, megabits per second (Mbps). During wireless data transmissions, data errors may be detected.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION

Reference will now be made in detail to examples, which are illustrated in the accompanying drawings. In the following detailed description, numerous specific details are set forth in order to provide a thorough understanding of the present disclosure. Also, the figures are illustrations of an example, in which components or procedures shown in the figures are not for implementing the present disclosure. In other instances, well-known methods, procedures, modules, units, and circuits have not been described in detail so as not to unnecessarily obscure features of the examples.

In an example, a method for controlling a data rate of a receiver is based on the level of data errors of the receiver detected by a transmitter. The transmitter may be equipment that generates radio waves for communication purposes. The receiver may be an electronic device that receives radio waves and converts the information carried by them to a usable form. In an example, a transmitter and a receiver combined in one unit is called a transceiver. The data error may be an error of a data unit, such as a data link error or a physical layer error, which may cause part or whole of the data unit not capable of being analyzed by the receiver. When the level of data errors is low, a higher data rate may be selected. Conversely, when the level of data errors is high, a lower data rate may be selected. In an example, the level of data errors may be presented by a data error ratio, wherein the data error ratio of a receiver may be a ratio of data units with errors to data units sent to the receiver. It is considered that the lower data rate may reduce the level of data errors caused by a demodulation failure at the receiver, wherein the demodulation failure may due to such as a low signal-to-interference-plus-noise ratio (SINR). In an example, the SINR is defined as the power of a certain signal of interest divided by the sum of the interference power from all the other interfering signals and the power of some background noise. However, not all the data errors are caused by the low SINR. For example, there are many other situations which may also cause the data errors, such as receiving buffer overflow, off-channel scanning, receiver CPU overloading, ACK is sent but does not arrive, etc.

Figure 1:
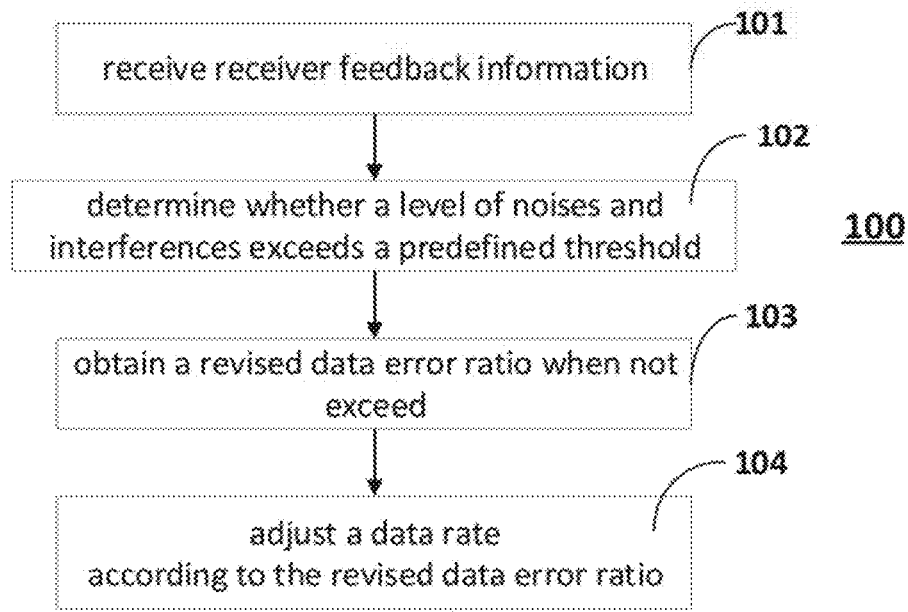
FIG. 1 is a flowchart illustrating a method of adjusting a data rate in a wireless network in accordance with an example of the present disclosure.

FIG. 1 is a flowchart illustrating an example method 100 of adjusting a data rate associated with a wireless device. In an example, the wireless device may be an access point. As used herein, an "access point" can refer to a networking device that allows a client device to connect to a wired or wireless network. The term "access point" (AP) can, for example, refer to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communication standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as RUM, EPROM, and Flash memory. The network may be a wireless network, for example, a Wireless Local Area Network (WLAN). As used herein, the term "wireless local area network" (WLAN) can, for example, refer to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

At block 101, a first wireless device may receive receiver feedback information from a receiver of a second wireless device. The receiver feedback information may be information collected by the receiver of the second wireless device relating to receiving status of the receiver. At block 102, the first wireless device may determine whether a level of noises and interferences associated with the receiver of the second wireless device exceeds a predefined threshold based on the receiver feedback information. When it is determined that the level of the noises and interferences associated with the receiver does not exceed the predefined threshold, the first wireless device may obtain (block 103) a revised data error ratio based on an original data error ratio and the receiver feedback information. In an example, the original data error ratio may be a data error ratio collected by the first wireless device. At block 104, the first wireless device may adjust a data rate associated with the receiver based on the revised data error ratio, and use the adjusted data rate to transfer data units to the receiver. It should be noted that the first wireless device may act as a transmitter at blocks 101-104.

In an example, the first wireless device may obtain a receiver data error ratio based on an individual data link error counter and a correct unit counter extracted from the receiver feedback information. The individual data link error counter may be the number of data units sent from a specific transmitter at a specific data rate with a data link error, and the correct unit counter may be the number of data units correctly received by the receiver of the second wireless device. Then, the first wireless device may compare the receiver data error ratio with the original data error ratio. When it is determined that the receiver data error ratio is smaller than the original data error ratio, the first wireless device may calculate the revised data error ratio based on the receiver data error ratio and the original data error ratio. It should be noted that when the receiver data error ratio is smaller than the original data error ratio, it reflects that the first wireless device acting as the transmitter may overestimate the data error ratio of the receiver of the second wireless device, which may cause a rate drop of the receiver. Accordingly, in examples of the present disclosure, the receiver data error ratio is used to correct the original data error ratio to prevent such situation.

In an example, the first wireless device may obtain a first weight factor based on a statistic window extracted from the receiver feedback information. The statistic window may be a time window defining the start and end of receiving result counters set at the receiver of the second wireless device. The first wireless device may obtain a second weight factor based on the first weight factor. Thereafter, the first wireless device may apply the first weight factor to the receiver data error ratio, and apply the second weight factor to the original data error ratio, to get the revised data error ratio. In an example, when it is determined that the level of the noises and interferences associated with the receiver of the second wireless device exceeds the predefined threshold, the first wireless device may retain the original data error ratio.

In an example, the first wireless device may compare a noise floor extracted from the receiver feedback information with a predefined noise threshold. The noise floor may be a sum of noise sources and unwanted signals measured by the receiver of the second wireless device. When the noise floor exceeds the predefined noise threshold, the first wireless device may determine to retain the original data error ratio.

In an example, the first wireless device may calculate a physical error ratio based on a physical layer error counter, a received unit counter and a channel utilization percentage extracted from the receiver feedback information. The physical layer error counter may be the number of data units received by the receiver with a physical layer error. The received unit counter may be the number of data units received by the receiver of the second wireless device. The channel utilization percentage may be a percentage of channel medium used at the receiver. Then, the first wireless device may compare the physical error ratio with a predefined physical error threshold. When the physical error ratio exceeds the predefined physical error threshold, the first wireless device may determine to retain the original data error ratio.

In an example, the first wireless device may calculate a demodulation error ratio based on a total data link error counter, a received unit counter and a channel utilization percentage extracted from the receiver feedback information. The total data link error counter may be the number of data units received by the receiver at a specific data rate with a data link error. The received unit counter may be the number of data units received by the receiver of the second wireless device. The channel utilization percentage may be a percentage of channel medium used at the receiver. The first wireless device may further compare the demodulation error ratio with a predefined demodulation error threshold. When the demodulation error ratio exceeds the predefined demodulation error threshold, the first wireless device may determine to retain the original data error ratio.

Figure 2:
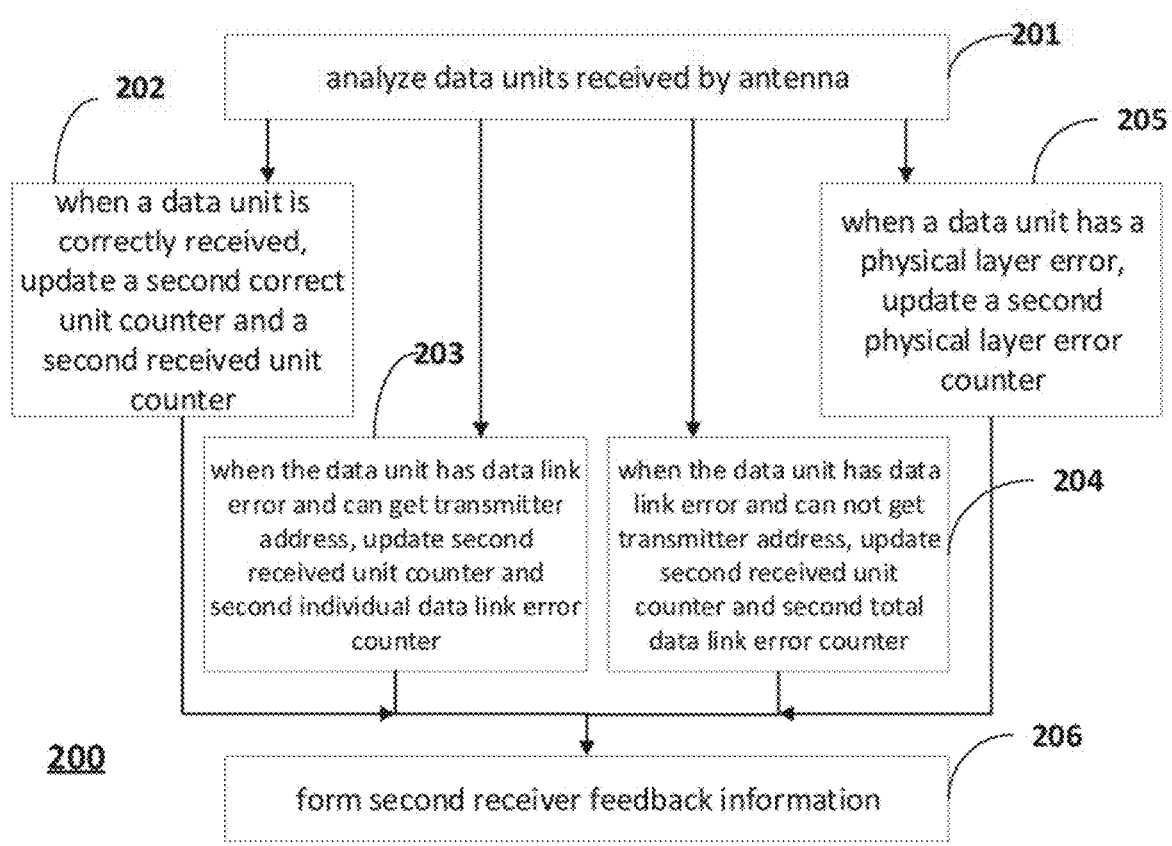
FIG. 2 is a flowchart illustrating a method of updating receiver feedback information in accordance with an example of the present disclosure.

In an example, the first wireless device may act as a receiver, and provide second receiver feedback information to a transmitter of a third wireless device. As shown in FIG. 2, the first wireless device may analyze (block 201) data units received by its antenna. When it is determined that a data unit is correctly received, the first wireless device may update (block 202) a second correct unit counter and a second received unit counter. In response to determining that the data unit has a data link error, the first wireless device may update (block 203) the second received unit counter and a second individual data link error counter when a transmitter address of the data unit is available, and update (204) the second received unit counter and a second total data link error counter when the transmitter address of the data unit is not available. In response to determining that the data unit has a physical layer error, the first wireless device may update (block 205) a second physical layer error counter. The first wireless device may use the second correct unit counter, the second received unit counter, the second individual data link error counter, the second total data link error counter, and the second physical layer error counter to form the second receiver feedback information (block 206).

As such, the first wireless device may store transmitter processing instructions to adjust a data error ratio as shown in FIG. 1, and/or store receiver processing instructions to update receiver feedback information as shown in FIG. 2. In other words, the first wireless device may either act as the transmitter to control data rates of receivers of other wireless devices, or act as the receiver to provide receiver feedback information to transmitters of other wireless devices in the same wireless network, or act as both the transmitter and the receiver.

Figure 3:
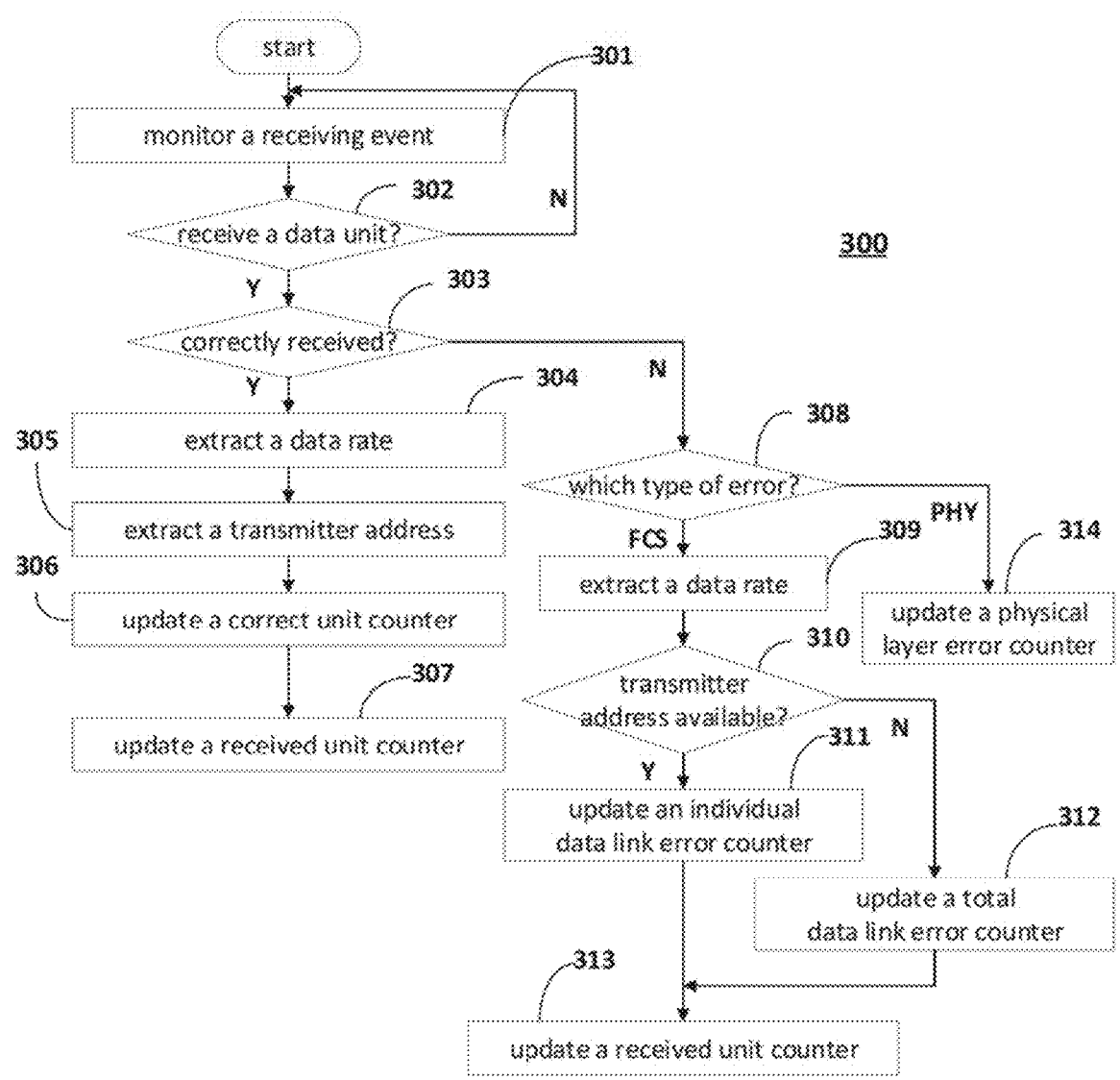
FIG. 3 is a flowchart illustrating a method of updating receiver feedback information in accordance with an example of the present disclosure.

FIG. 3 is a flowchart illustrating an example process 300 of updating receiver feedback information. The receiver feedback information may include a set of counters for recording receiving results of data units at a receiver. The receiver herein may refer to a wireless device whose function is to receive data units in the example process 300. In an example, the receiver feedback information may be such as a correct unit counter, a received unit counter, an individual data link error counter, a total data link error counter, a physical layer error counter, etc. Specifically, the correct unit counter may be a counter for recording the number of data units correctly received by the receiver. In an example, the receiver may set a correct unit counter for recording the number of data units transmitted on each data rate from a transmitter. The transmitter herein may refer to another wireless device whose function is to transmit data units in the example process 300. In other words, receiving results from different transmitters on different data rates may be recorded by different correct unit counters, individually. Usually, the data rate may be expressed as a number of elements of data (such as bits, characters, blocks, or frames) per unit time, and carried in the preamble of the data unit being transmitted. The received unit counter may be a counter for recording the number of data units received from a plurality of transmitters on a plurality of data rates. A data unit with or without a data link error may be counted by the received unit counter. The individual data link error counter may be a counter for recording the number of data units received with a data link error, such as a frame checksum (FCS) error. The FCS may refer to an extra error-detecting code added to a data frame in a communications protocol. In an example, the receiver may set an individual data link error for each data rate from a specific transmitter. The data link error may indicate that it is checked on the data link layer that the data unit gets corrupted during transmission. The total data link error counter may be a counter for recording the number of data units having a specific data rate with the data link error, regardless of which transmitter the data units are sent from. In other words, the total data link error counter may record the total number of data units sent from transmitters that cannot be successfully identified by the receiver. The physical layer error counter may be a counter for recording the number of data units received with a physical layer error. The physical layer error may refer to a data transmission error discovered on the physical layer, usually caused by such as a non-WLAN interference.

At first, the receiver may monitor a receiving event (block 301). When the receiver detects a signal on a wireless channel, it may start receiving a data unit via its antenna. At block 302, it may extract information from the data unit, to determine receiving status of the data unit. The data unit may be a unit of information delivered among entities of a wireless network. In an example, the data unit may contain control information such as network address, or user data. For example, the data unit could be a data packet, or a wireless frame defined by various network protocols such as 802.11 series of standards.

When it is determined that the data unit is correctly received (block 303), the receiver may extract a data rate from the data unit (block 304). In an example, a transmitter may calculate a checksum of a data unit and append it to the data unit. When the receiver receives the data unit, it may calculate the checksum again. By comparing the checksum carried in the data unit and the checksum calculated by the receiver itself, the receiver can determine whether the data unit is correctly received or not. Also, the receiver may extract a transmitter address from the data unit (block 305). In an example, the data rate may be rate1, while the transmitter address may be station1. Then, the receiver may update (block 306) the correct unit counter rx_ok (rate1, station1) corresponding to rate1 and station1, e.g., add 1 to rx_ok (rate1, station1). In another example, the data rate may be rate1, while the transmitter address may be station3. Then, the receiver may update (block 306) the correct unit counter rx_ok (rate1, station3) corresponding to rate1 and station3. In yet another example, the data rate may be rate2, while the transmitter address may be station1. Then, the receiver may update (block 306) the correct unit counter rx_ok (rate2, station1) corresponding to rate2 and station1. Also, the receiver may update (block 307) the received unit counter rx_mac, e.g., add 1 to rx_mac.

In an example, when it is determined that the data unit is received but there is an error in the data unit, determine the type of the error (block 308). If there is an FCS error in the data unit, it means that a physical (PHY) header is received correctly while a PHY payload has an error. Therefore, the receiver can get the data rate, but the transmitter address may or may not be available. As such, the receiver may extract the data rate from the data unit (block 309). Further, the receiver may determine whether the transmitter address is available or not (block 310). In response to the determination that the transmitter address is available, the receiver may update (block 311) the individual data link error counter rx_fcs_individual (rate_i, station_j), e.g., add 1 to rx_fcs_individual (rate_i, station_j), wherein rate_i stands for the ith data rate and station_j stands for the jth wireless device. For example, the data rate determined at block 309 is rate2, and the transmitter address is station2, then rx_fcs_individual (rate2, station2) is updated. During the operation of block 311, the receiver may further check a Received Signal Strength Indicator (RSSI), to determine whether the RSSI is within the range of an average RSSI of a transmitter indicated by the transmitter address. That is, block 311 may be performed when the RSSI is within the range of the average RSSI. In this way, the wrong counting of FCS errors from other transmitters may be eliminated.

In response to the determination that the transmitter address is not available, the receiver may update (block 312) the total data link error counter rx_fcs(rate_i), e.g., add 1 to rx_fcs(rate_i), wherein rate_i stands for the ith data rate. Also, the receiver may update (block 313) the received unit counter rx_mac, e.g., add 1 to rx_mac.

In an example, the receiver may further check the RSSI when the FCS error is reported at block 308, and perform blocks 309-313 when it is determined that the RSSI is above a predefined RSSI threshold. When the RSSI is below the RSSI threshold, blocks 309-313 may be ignored.

In an example, when a physical layer error is reported, it means that the PHY header in the data unit is incorrect and the receiver cannot get the data rate. The receiver may update (block 314) the physical layer error counter rx_phy, e.g., add 1 to rx_phy. During the operation of block 314, the receiver may further check the RSSI, to determine whether the RSSI is weak or not. For example, the receiver may check whether the RSSI is below a predefined RSSI threshold, and if yes, ignore block 314.

Figure 4:
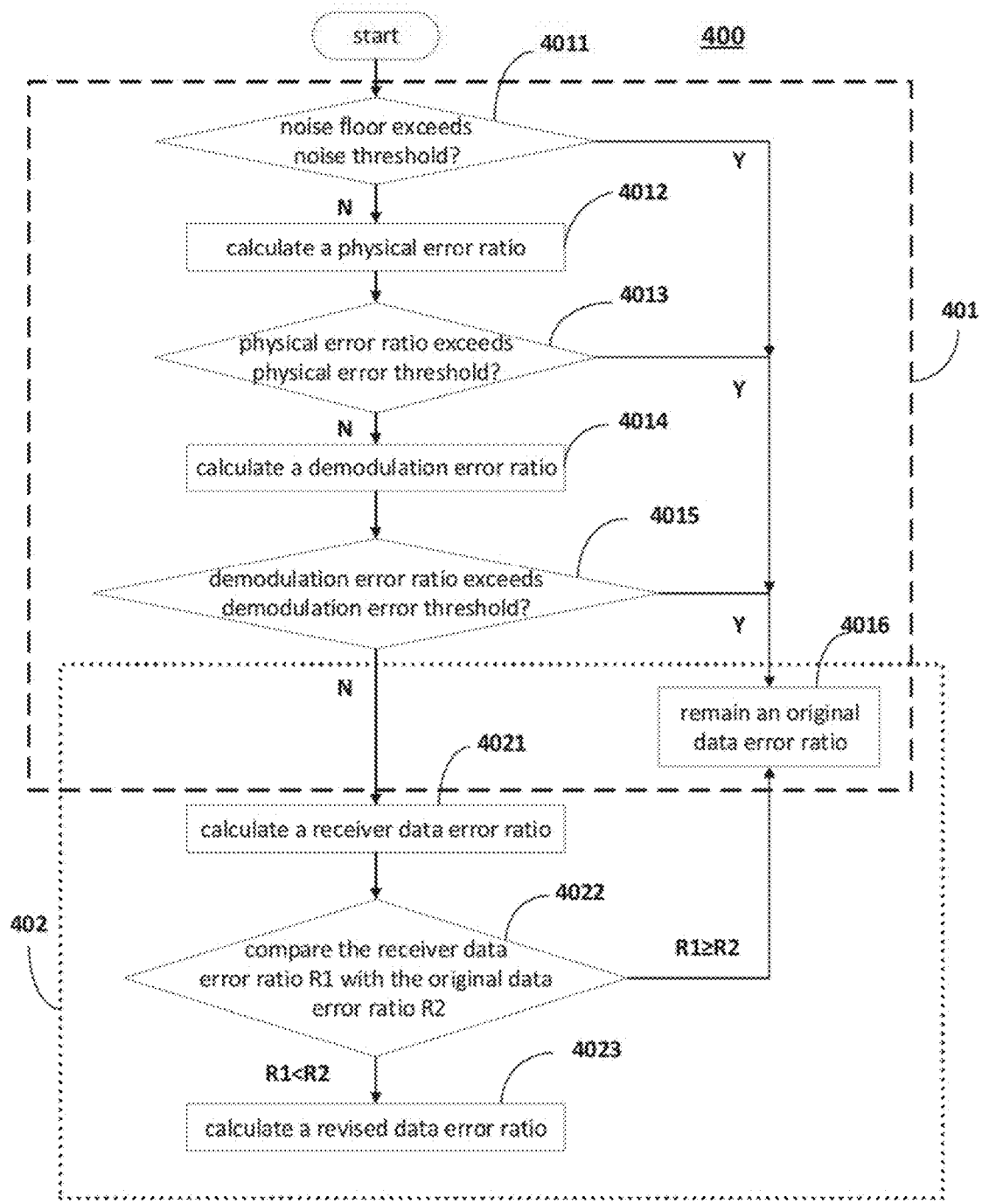
FIG. 4 is a flowchart illustrating a method of adjusting a data error ratio in accordance with an example of the present disclosure.

FIG. 4 is a flowchart illustrating an example process 400 of adjusting a data error ratio at a transmitter. In an example, the data error ratio may be the number of incorrectly received data units divided by the total number of received data units. In radio communication, data units transmitted over a wireless channel may be altered due to such as noise, interference, distortion or synchronization errors, thereby causing the data units being received incorrectly. In an example, the data error ratio may be a packet error ratio (PER), which is the number of incorrectly received data packets divided by the total number of received data packets. The PER is maintained by the transmitter for each receiver on each data rate.

At block 401, the transmitter may evaluate a level of noises and interferences of a receiver based on receiver feedback information, to determine whether to retain an original data error ratio or not. In other words, the transmitter may identify a low SINR situation based on the receiver feedback information, and retain the original data error ratio for the low SINR situation. Specifically, the transmitter may perform blocks 4011-4016 step by step.

First, the transmitter may obtain a noise floor, and compare it with a noise threshold (block 4011). When it is determined that the noise floor exceeds the noise threshold, perform block 4016 to retain the original data error ratio, and end the process 400 of adjusting the data error ratio. Since the noise floor is very high, it reflects that there is noisy environment at the receiver. Therefore, the data error ratio for all data rates may not be revised. In an example, the noise floor may be the measure of signals created from the sum of all the noise sources and unwanted signals within a measurement system, where noise is defined as any signal other than the one being monitored. For example, the noise floor may include thermal noise, black body, cosmic noise as well as atmospheric noise from distant thunderstorms and similar, and any other unwanted man-made signals, sometimes referred to as incidental noise. In an example, the noise floor may be measured and given by a radio chipset of the receiver.

When it is determined that the noise floor does not exceed the noise threshold, the transmitter may calculate (block 4012) a physical error ratio. The physical error ratio may be a kind of ratio measured based on physical layer errors, and reflect an interference level at the receiver. In an example, the physical error ratio may be calculated as follows:

$$\text{phy\_error\_ratio} = \frac{\text{rx\_phy}}{\text{rx\_phy} + \text{rx\_mac}} \times \text{channel\_utilization\_percentage} \quad (1)$$

where phy_error_ratio stands for the physical error ratio, rx_phy is the physical layer error counter, rx_mac is the received unit counter, and channel_utilization_percentage is the channel utilization percentage.

At block 4013, the transmitter may compare the physical error ratio with a physical error threshold. When it is determined that the physical error ratio exceeds the physical error threshold, end the process 400 of adjusting the data error ratio. It is because when the physical error ratio is high, it means that the receiver may have a heavily interfered environment. Accordingly, the data error ratio for all data rates may not be revised.

When it is determined that the physical error ratio does not exceed the physical error threshold, the transmitter may calculate (block 4014) a demodulation error ratio. The demodulation error ratio may be a kind of ratio determined based on demodulation errors. In an example, the demodulation error ratio may be calculated as follows:

$$\text{demodulation\_error\_ratio} = \frac{\text{rx\_fcs}}{\text{rx\_mac}} \times \text{channel\_utilization\_percentage} \quad (2)$$

where demodulation_error_ratio stands for the demodulation error ratio, rx_fcs is the total data link error counter, rx_mac is the received unit counter, and channel_utilization_percentage is the channel utilization percentage. Since different data rates have different total data link error counters, the demodulation error ratio may vary with the data rates, as well.

At block 4015, the transmitter may determine whether the demodulation error ratio exceeds a demodulation error threshold, and if yes, perform block 4016. Otherwise, perform block 402. Specifically, the demodulation error ratio can reflect the likelihood that the receiver cannot decode a specific data rate. When the demodulation error ratio is high, it may be considered that the receiver cannot work well with the corresponding data rate. As such, the data error ratio for this data rate may not be revised by the receiver feedback information.

In an example, the transmitter may first perform block 4011, and then execute block 402 when it is determined that the noise floor does not exceed the noise threshold. That is, blocks 4012-4015 may be skipped. In an example, the transmitter may first perform blocks 4012-4013, and execute block 402 when it is determined that the physical error ratio does not exceed the physical error threshold. That is, blocks 4011, 4014, 4015 may be skipped. In an example, the transmitter may first perform blocks 4014-4015, and execute block 402 when it is determined that the demodulation error ratio does not exceed the demodulation error threshold. That is, blocks 4011-4013 may be skipped. There are other combinations for executing blocks 4011-4015, for example performing blocks 4011-4013 and skipping blocks 4014-4015. The transmitter may consider any of a high noise floor, a high physical error ratio, and a high demodulation error ratio as a low SINR situation.

At block 402, the transmitter may revise the original data error ratio based on the receiver feedback information. Specifically, the transmitter may perform blocks 4021-4023 in sequence.

At block 4021, the transmitter may calculate a receiver data error ratio based on the correct unit counter and the individual data link error counter. The receiver data error ratio may be a receiver packet error ratio. In an example, the receiver packet error ratio may be a packet error ratio determined at the receiver side, which can be calculated as follows:

$$\text{PER\_rx} = \frac{\text{rx\_fcs\_individual}}{\text{rx\_fcs\_individual} + \text{rx\_ok}} \quad (3)$$

where PER_rx is the receiver packet error ratio, rx_fcs_individual is the individual data link error counter, and rx_ok is the correct unit counter. Since the individual data link error counter is relevant to the data rate, the receiver packet error ratio is relevant to the data rate, as well.

At block 4022, the transmitter may compare the receiver data error ratio and the original data error ratio. In an example, the original data error ratio may be a transmitter packet error ratio, which is a packet error ratio originally obtained at the transmitter side. In an example, the transmitter may update the transmitter packet error ratio after each transmission as follows:

$$\text{PER\_tx}(\text{rate\_m}, \text{receiver\_n}) = \frac{\text{transmission\_not\_acknowledged}}{\text{total\_transmission}} \quad (4)$$

where PER_rx is the transmitter packet error ratio, rate_m is the mth data rate, receiver_n is the nth receiver recorded in the transmitter, transmission_not_acknowledged is the number of data units sent from the transmitter to the nth receiver without an ACK message as a response, and total transmission is the total number of data units sent from the transmitter to the nth receiver.

When it is determined that the receiver data error ratio R1 is smaller than the original data error ratio R2, the transmitter may calculate (block 4023) a revised data error ratio based on the receiver data error ratio and the original data error ratio. As such, the revised data error ratio may better reflect errors of data units caused by the low SINR situation while eliminate the impact of errors caused by other situations at the receiver. In an example, the revised data error ratio is a revised packet error ratio PER_rev, which may be determined as follows:

$$PER\_rev = PER\_rx \times w1 + PER\_tx \times w2 \quad (5)$$

where PER_rx is the receiver packet error ratio, PER_tx is the transmitter packet error ratio, w1 is the first weight factor, and w2 is the second weight factor. In an example, the first weight factor w1 may reflect the weight of the receiver feedback information. The first weight factor is within the range of 0 to 1, and the second weight factor is also within the range of 0 to 1.

In an example, when the statistic window is 1024 packets, w1 is set as 0.3.

$$w1 = \begin{cases} 0.3 \times \text{statistic window}/1024, \text{ when statistic window} < 1024; \\ 0.3 + 0.1 \times \log(\text{statistic window}/1024), \\ \quad \text{when } 102400 > \text{statistic window} \geq 1024; \\ 0.5, \text{ when statistic window} \geq 102400 \end{cases} \quad (6)$$

$$w2 = 1.0 - w1 \quad (7)$$

With the revision performed at block 402, the revised data error ratio may be smaller than the original data error ratio. In this way, when using the revised data error ratio to select a data rate, a relatively higher data rate may be selected, thereby avoiding a downgrade of channel efficiency as well as a downgrade of overall throughput of the wireless network. In an example, the transmitter may use a data error threshold when selecting a data rate for a receiver based on the data error ratio. For each data rate, if its data error ratio is below the data error threshold, it can be a candidate rate. The highest data rate may be selected among all the candidate rates. If data error ratios of all the data rates are above the data error threshold, the transmitter may choose the one with the lowest data error ratio or choose the lowest data rate.

In this way, the transmitter may differentiate a low SINR situation from other situations causing errors of data units, and fix up the data error ratio for a good SINR situation. At block 401, the transmitter may confirm that the receiver is in the low SINR situation, therefore the original data error ratio is not changed, and the data rate of the receiver is adjusted by the original data error ratio. At block 402, the transmitter may know that the errors of data units are caused by other situations instead of the low SINR situation. In other words, the receiver is in fact in a relatively good SINR situation. It should be noted that a low data rate is useful for the low SINR situation, but not helpful for other situations. Therefore, the transmitter may revise the original data error ratio by using the receiver feedback information, to avoid data rate drop for the receiver.

Figure 5:
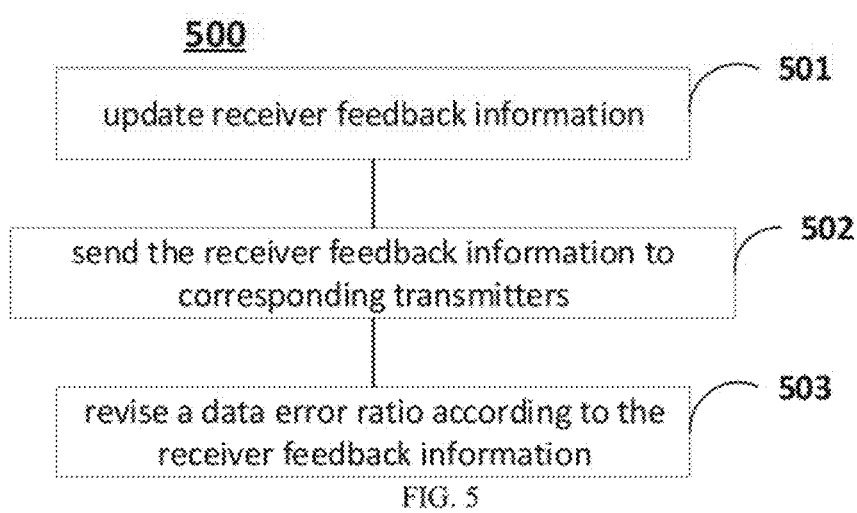
FIG. 5 is a flowchart illustrating a method of adjusting a data rate in a wireless network in accordance with an example of the present disclosure.

FIG. 5 is a flowchart illustrating an example process 500 of adjusting a data rate in a wireless network.

At block 501, a receiver may update receiver feedback information based on receiving status of data units transmitted from a plurality of transmitters. In an example, the implementation of block 501 may refer to such as FIG. 3.

At block 502, the receiver may send the receiver feedback information back to corresponding transmitters. Both two wireless devices of a wireless link may send receiver feedback information to each other periodically. In an example, the receiver feedback information may be carried in a periodic message transmitted on each wireless link between two wireless devices. In another example, a WLAN action frame can be used to send the receiver feedback information, wherein the receiver feedback information may be wrapped in a vendor-defined information element (IE). The receiver feedback information may require just a few bytes, so the overhead is low. In an example, the format of vendor-defined IE for carrying the receiver feedback information may include an identity (id) number, a length, and the content of the receiver feedback information. In an example, the wireless link may be a mesh link between mesh nodes. The mesh node may use parameters defined in a mesh cluster profile, to establish the mesh link with a neighboring mesh node.

At block 503, a transmitter may use the receiver feedback information to revise a data error ratio, and use the revised data error ratio to select a data rate. In this way, data rates may properly be adjusted. In an example, the implementation of block 503 may refer to such as FIG. 4. In an example, there is a data rate set on the transmitter. The data rate set may depend on the capability of the transmitter, such as the number of spatial streams, the maximum channel bandwidth supported, etc.

Table 1 is a data rate set of an AP in Megabits per second (Mbps). In the first column of Table 1, 20 MHz may refer to the scenario that the maximum channel bandwidth supported by the AP is 20 MHz. A short guard interval (SGI) may be adapted in data transmission to increase the data rate of the AP.

TABLE 1

| MCS Index | Spatial Streams | Modulation | Coding | 20 MHz | 20 MHz SGI | 40 MHz | 40 MHz SGI | 80 MHz | 80 MHz SGI |
|---|---|---|---|---|---|---|---|---|---|
| 0 | 1 | BPSK | ½ | 6.5 | 7.2 | 13.5 | 15 | 29.3 | 32.5 |
| 1 | 1 | QPSK | ½ | 13 | 14.4 | 27 | 30 | 58.5 | 65 |
| 2 | 1 | QPSK | ¾ | 19.5 | 21.7 | 40.5 | 45 | 87.8 | 97.5 |
| 3 | 1 | 16-QAM | ½ | 26 | 28.9 | 54 | 60 | 117 | 130 |
| 4 | 1 | 16-QAM | ¾ | 39 | 43.3 | 81 | 90 | 175.5 | 195 |
| 5 | 1 | 64-QAM | ⅔ | 52 | 57.8 | 108 | 120 | 234 | 260 |
| 6 | 1 | 64-QAM | ¾ | 58.5 | 65 | 121.5 | 135 | 263.3 | 292.5 |
| 7 | 1 | 64-QAM | ⅚ | 65 | 72.2 | 135 | 150 | 292.5 | 325 |
| 8 | 1 | 256-QAM | ¾ | 78 | 86.7 | 162 | 180 | 351 | 390 |
| 9 | 1 | 256-QAM | ⅚ | n/a | n/a | 180 | 200 | 390 | 433.3 |
| 0 | 2 | BPSK | ½ | 13 | 14.4 | 27 | 30 | 58.5 | 65 |
| 1 | 2 | QPSK | ½ | 26 | 28.9 | 54 | 60 | 117 | 130 |
| 2 | 2 | QPSK | ¾ | 39 | 43.3 | 81 | 90 | 175.5 | 195 |
| 3 | 2 | 16-QAM | ½ | 52 | 57.8 | 108 | 120 | 234 | 260 |
| 4 | 2 | 16-QAM | ¾ | 78 | 86.7 | 162 | 180 | 351 | 390 |
| 5 | 7 | 64-QAM | ⅔ | 104 | 115.6 | 216 | 240 | 468 | 520 |
| 6 | 2 | 64-QAM | ¾ | 117 | 130.3 | 243 | 270 | 526.5 | 585 |
| 7 | 2 | 64-QAM | ⅚ | 130 | 144.4 | 270 | 300 | 585 | 650 |

TABLE 1-continued

| MCS Index | Spatial Streams | Modulation | Coding | 20 MHz | 20 MHz SGI | 40 MHz | 40 MHz SGI | 80 MHz | 80 MHz SGI |
|---|---|---|---|---|---|---|---|---|---|
| 8 | 2 | 256-QAM | ¾ | 156 | 173.3 | 324 | 360 | 702 | 780 |
| 9 | 2 | 256-QAM | ⅚ | n/a | n/a | 360 | 400 | 780 | 866.7 |
| 0 | 3 | BPSK | ½ | 19.5 | 21.7 | 40.5 | 45 | 87.8 | 97.5 |
| 1 | 3 | QPSK | ½ | 39 | 43.3 | 81 | 90 | 175.5 | 195 |
| 2 | 3 | QPSK | ¾ | 58.5 | 65 | 121.5 | 135 | 263.3 | 292.5 |
| 3 | 3 | 16-QAM | ½ | 78 | 86.7 | 162 | 180 | 351 | 390 |
| 4 | 3 | 16-QAM | ¾ | 117 | 130 | 243 | 270 | 526.5 | 585 |
| 5 | 3 | 64-QAM | ⅔ | 156 | 173.3 | 324 | 360 | 702 | 780 |
| 6 | 3 | 64-QAM | ¾ | 175.5 | 195 | 364.5 | 405 | n/a | n/a |
| 7 | 3 | 64-QAM | ⅚ | 195 | 216.7 | 405 | 450 | 877.5 | 975 |
| 8 | 3 | 256-QAM | ¾ | 234 | 260 | 486 | 540 | 1053 | 1170 |
| 9 | 3 | 256-QAM | ⅚ | 260 | 288.9 | 540 | 600 | 1170 | 1300 |

In an example, the method of adjusting data rates may be adapted in diverse types of wireless networks, such as a wireless mesh network including mesh nodes, a cellular network including base stations and mobile stations, or a wireless local area network (WLAN) including access points (APs) and client stations. In an example, the wireless mesh network is a network topology in which each mesh node relays data for the wireless network. All mesh nodes cooperate in the distribution of data in the wireless network.

Figure 6:
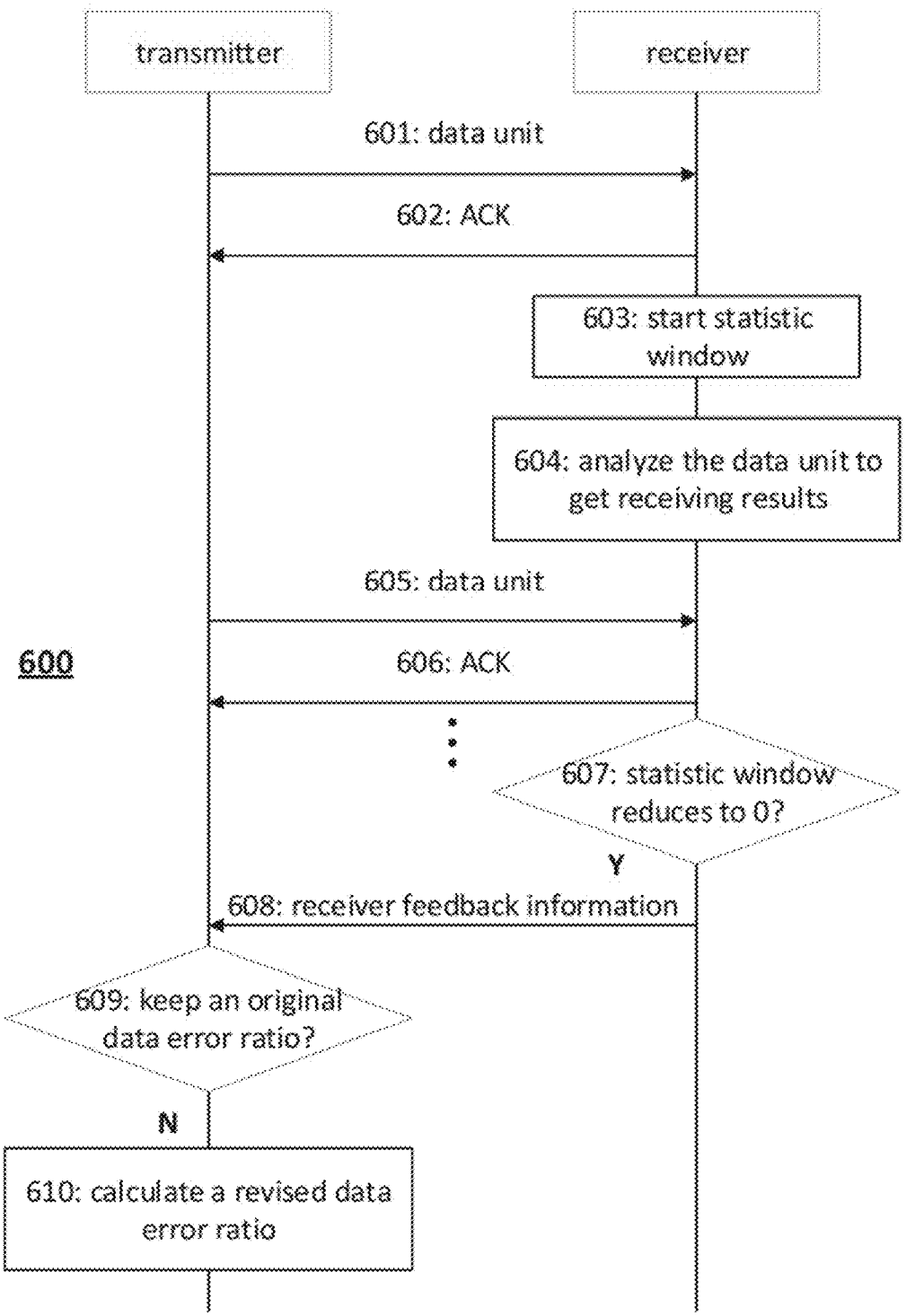
FIG. 6 is a signaling interaction process between a transmitter and a receiver in a wireless network in accordance with an example of the present disclosure.

FIG. 6 is a flowchart illustrating a signaling interaction process 600 between a transmitter and a receiver in a wireless network.

A transmitter may send (601) a data unit to a receiver. The receiver may respond (602) an ACK message to the transmitter. Meanwhile, the receiver may start (603) a statistic window to monitor receiving status within a period. The receiver may analyze (604) the data unit to get receiving results of the data unit. The transmitter may send (605) another data unit to the receiver, and the receiver may respond (606) a corresponding ACK message to the transmitter. Each time the receiver analyzes a data unit, receiving result counters of the data unit may be updated, and the length of the statistic window may be shortened by 1. When it is determined (607) by the receiver that the statistic window reduces to 0, the receiver may send (608) receiver feedback information to the transmitter and reset the statistic window. In an example, the default value of the statistic window may be 1024. After receiving the receiver feedback information, the transmitter may determine (609) whether an original data error ratio may be kept or not. If the original data error ratio may not be kept, the transmitter may calculate (610) a revised data error ratio in consideration of the receiver feedback information.

In an example, the receiver feedback information may include the receiving result counters and receiver auxiliary data. The receiving result counters may be a set of counters for recording the number of data units with specific receiving results, such as correctly received, received with data link error, or received with physical layer error, etc. Specifically, the receiving result counters may include at least one counter selected from the group including a correct unit counter rx_ok for the transmitter, an individual data link error counter rx_fcs_individual for the transmitter, a total data link error counter rx_fcs, a received unit counter rx_mac, and a physical layer error counter rx_phy. It should be noted that the correct unit count and the individual data link error counter are maintained for each transmitter, therefore the receiver may send back counters corresponding to the transmitter. For example, the receiver may send back the correct unit counter rx_ok (rate1, station1) and the correct unit counter rx_ok (rate2, station1) to station1, while send back the correct unit counter rx_ok (rate1, station2) and the correct unit counter rx_ok (rate2, station2) to station2. In an example, the receiving result counters sent back to the transmitter may include an array of rx_ok, an array of rx_fcs_individual, an array of rx_fcs. The array of rx_ok may be represented as rx_ok (rate1, rate2, . . . , rate M), the array of rx_fcs_individual may be represented as rx_fcs_individual (rate1, rate2, . . . , rate M), and the array of rx_fcs may be represented as rx_fcs (rate1, rate2, . . . , rate M), wherein M is the number of data rates of the transmitter used to send data units to the receiver.

The receiver auxiliary data may be data for reflecting the overall state of the receiver. In an example, the receiver auxiliary data may include a statistic window, wherein the statistic window is a time window for defining the start and end of the receiving result counters. In an example, the receiver auxiliary data may include a channel utilization percentage, which may be a percentage of channel medium being used. In an example, the channel utilization percentage is calculated as follows:

$$\text{channel\_utilization\_percentage} = \frac{\text{channel busy cycles}}{\text{measured cycles}} \times 100 \qquad (8)$$

where channel_utilization_percentage represents the channel utilization percentage, the channel busy cycles are the number of cycles when the wireless channel is detected to be busy, and the measured cycles are the number of cycles detected. In each cycle, the radio chipset may detect whether the wireless channel is busy. If the wireless channel is busy, the channel busy cycles may be updated. In an example, the receiver auxiliary data may include a noise floor, wherein the noise floor may be signals created from the sum of all the noise sources and unwanted signals within a measurement system.

Figure 7:
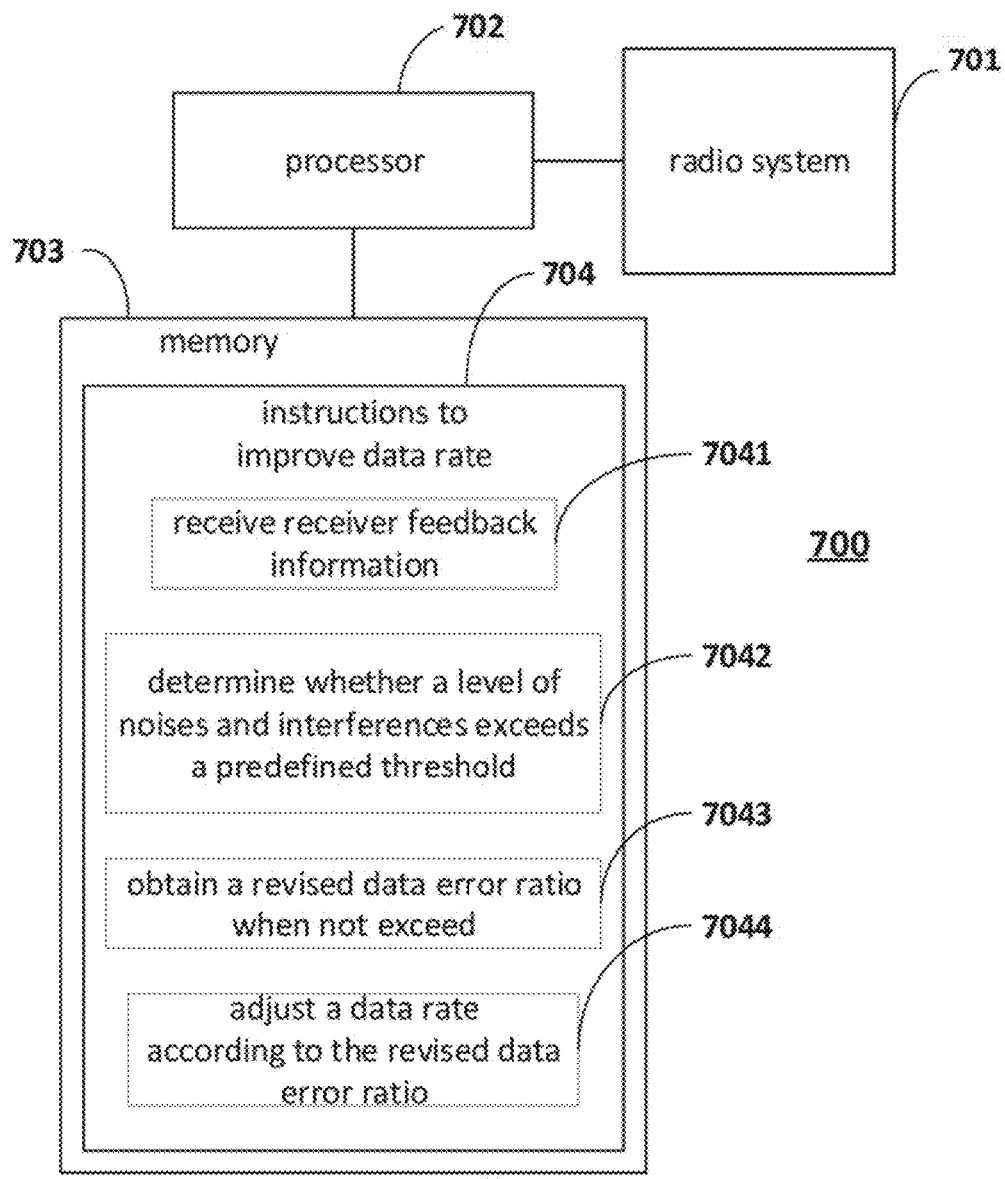
FIG. 7 is a block diagram illustrating the structure of a wireless device in accordance with an example of the present disclosure.

FIG. 7 is a block diagram illustrating the structure of a wireless device 700 in accordance with an example of the present disclosure. In an example, the wireless device 700 may include a radio system 701 including an antenna, to receive 7041 receiver feedback information. The wireless device 700 may further include a processor 702, a memory 703, and instructions 704 stored on the memory 703 and executable by the processor 702. In an example, the instructions are to determine 7042 whether a level of noises and interferences of the receiver exceeds a predefined threshold based on the receiver feedback information. When it is determined that the level of noises and interferences of the receiver does not exceed the predefined threshold, the instructions are to obtain 7043 a revised data error ratio based on an original data error ratio and the receiver feedback information. Thereafter, the instructions are to adjust 7044 the data rate of the receiver based on the revised data error ratio. In an example, the wireless device 700 may be a mesh node in a wireless mesh network, or a base station in a cellular network, or a mobile station in the cellular network, or an access point in a WLAN network, or a client station in the WLAN network. In an example, the instructions 704 may perform operations illustrated in such as FIGS. 1-6.

Figure 8:
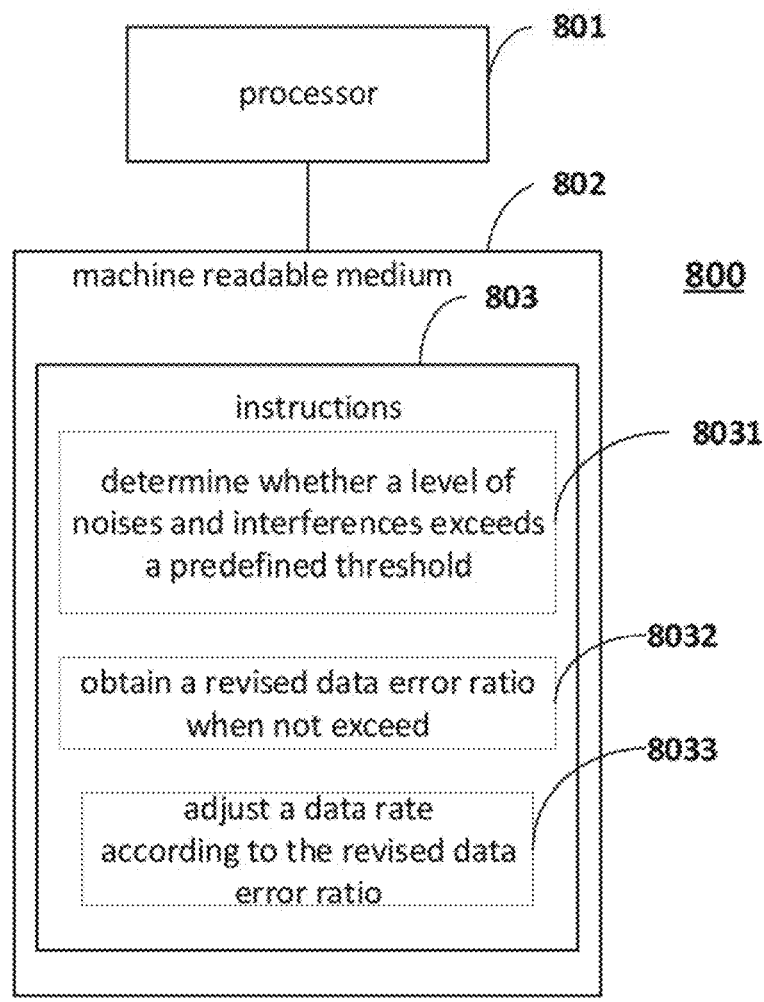
FIG. 8 is a block diagram illustrating the structure of a network device 800 in accordance with an example of the present disclosure.

FIG. 8 is a block diagram illustrating the structure of a network device 800 in accordance with an example of the present disclosure. In an example, the network device 800 may include: a processor 801, a non-transitory machine-readable medium 802 for storing instructions 803.

As used herein, a network device may be implemented, at least in part, by a combination of hardware and programming. For example, the hardware may comprise at least one processor (e.g., processor 801) and the programming may comprise instructions, executable by the processor(s), stored on at least one machine-readable storage medium (e.g., memory 802). In addition, a network device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

The at least one processor 801 may fetch, decode, and execute instructions 803 stored on storage medium to perform the functionalities described below. In other examples, the functionalities of any instructions of storage medium may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 8, storage medium may be implemented by one machine-readable storage medium, or multiple machine-readable storage media. Although network device 800 includes at least one processor 801 and machine-readable storage medium (e.g., memory 802), it may also include other suitable components, such as additional processing component(s) (e.g., processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid-state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

In an example, the instructions 803 are to be executed by the processor 801 to: determine (8031) whether a level of noises and interferences of the receiver exceeds a predefined threshold based on receiver feedback information, wherein the receiver feedback information is information collected by a receiver relating to receiving status. When it is determined that the level of noises and interferences of the receiver does not exceed the predefined threshold, the instructions 803 may be executed by the processor 801 to obtain (8032) a revised data error ratio based on an original data error ratio and the receiver feedback information, wherein the original data error ratio is a data error ratio collected by the transmitter. Then, the instructions 803 may be executed by the processor 801 to adjust (8033) the data rate of the receiver based on the revised data error ratio.

In an example, the instructions 803 are to be executed by the processor 801 to: obtain a receiver data error ratio based on an individual data link error counter and a correct unit counter extracted from the receiver feedback information. In an example, the individual data link error counter may be the number of data units sent from the transmitter at a specific data rate with a data link error, and the correct unit counter may be the number of data units correctly received by the receiver. Then, the instructions 803 are to be executed by the processor 801 to: compare the receiver data error ratio with the original data error ratio, and when it is determined that the receiver data error ratio is smaller than the original data error ratio, calculate the revised data error ratio based on the receiver data error ratio and the original data error ratio.

In an example, the instructions 803 are further to be executed by the processor 801 to: analyze data units received by the network device 800, and when it is determined that a data unit is correctly received, update a second correct unit counter and a second received unit counter. When it is determined that the data unit has a data link error, the instructions 803 are further to be executed by the processor 801 to update the second received unit counter and a second individual data link error counter when a transmitter address of the data unit is available, and update the second received unit counter and a second total data link error counter when the transmitter address of the data unit is not available. When it is determined that the data unit has a physical layer error, the instructions 803 are further to be executed by the processor 801 to update a second physical layer error counter. Thereafter, the instructions 803 are further to be executed by the processor 801 to form second receiver feedback information by using the second correct unit counter, the second received unit counter, the second individual data link error counter, the second total data link error counter, and the physical layer error counter.

Figure 9:
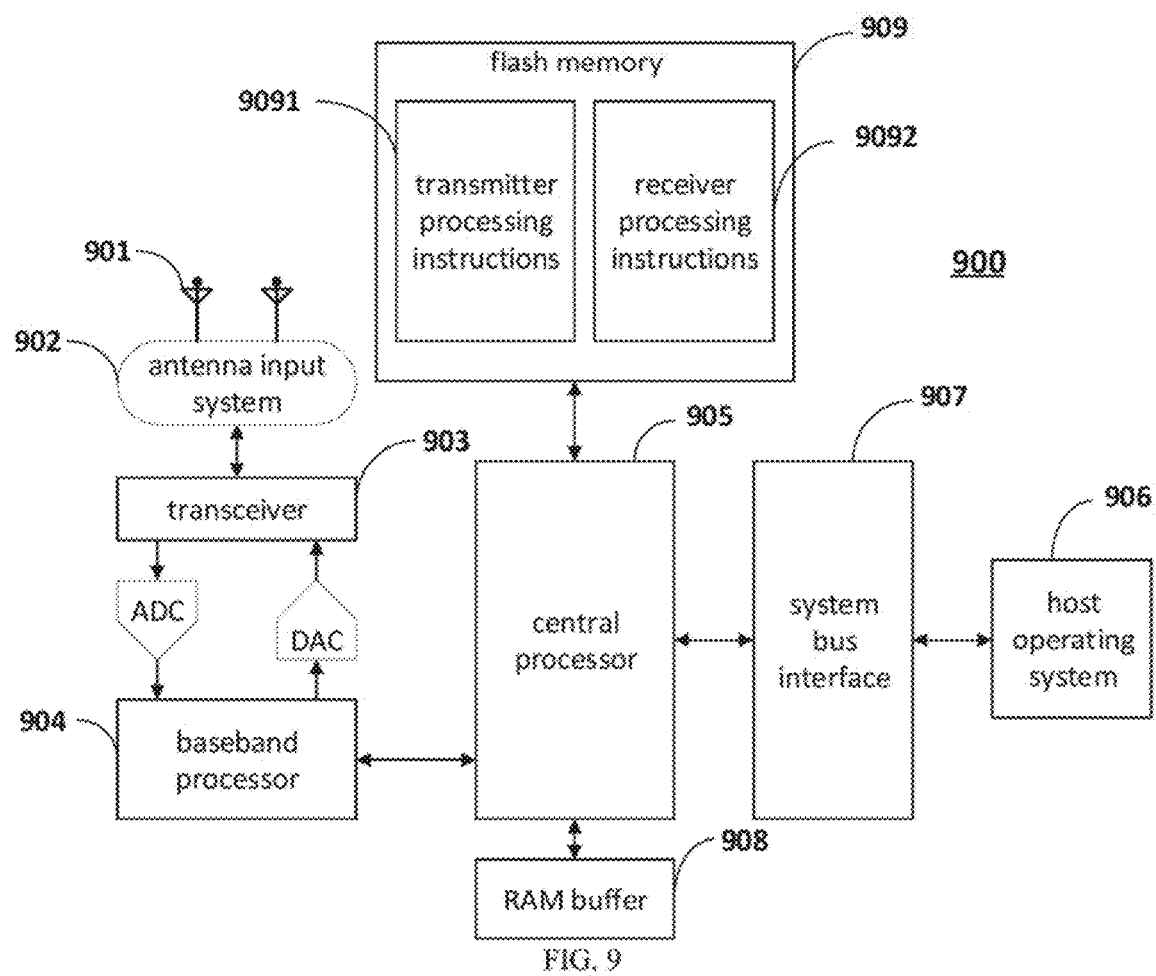
FIG. 9 is a block diagram illustrating a detailed structure of the wireless device as shown in FIG. 7 in accordance with an example of the present disclosure.

FIG. 9 is a block diagram illustrating a detailed structure of a wireless device 900 in accordance with an example of the present disclosure. The wireless device 900 may include several antennas 901 and an antenna input system 902. In an example, two antennas 901 may be used in the wireless device 900 for antenna diversity to enhance reception in the presence of multipath interference. When the antenna 901 receives a radio signal, it may deliver the radio signal to a transceiver 903. The transceiver 903 may use amplifiers to boost an outgoing radio signal for distance, or an incoming radio signal for further processing. The transceiver 903 may also convert high-frequency radio signals into much more manageable radio signals by extracting data bits from high-frequency radio waves. After that, the transceiver 903 may provide the radio signals to a baseband processor 904. In an example, the baseband processor 904 is the interface between digital and analog parts of the wireless device 900.

Data bits come from a computer may be turned into radio waves for the antenna 901 by the baseband processor 904, which is called modulation.

Thereafter, the baseband processor 904 may send data frames demodulated from the radio signals to a central processer 905. In an example, the central processor 905 may be a medium access controller (MAC). The central processor 905 may be responsible for taking incoming data frames from a host operating system 906 and deciding when to squirt the data frames out to the antenna 901 into the air. The central processor 904 may accept the data frames from the host operating system 906 for delivery through a system bus interface 907. On the other side of the central processor 905, it may tie into the baseband processor 904 to send outgoing data frames to the antenna 901. In an example, the wireless device 900 may include a RAM buffer 908 to store data units being worked on by the central processor 905. In addition to the RAM buffer 908 for data units in process, the wireless device 900 may also have a flash memory 909 to store firmware for the central processor 905. When the central processor 905 is powered up, it may retrieve and run code from the flash memory 909. In an example, the flash memory 909 may store transmitter processing instructions 9091 as illustrated in such as FIGS. 1-8. In an example, the flash memory 909 may store receiver processing instructions 9092 as illustrated in such as FIGS. 1-8. In an example, the central processor 905 is a generic microprocessor. The firmware stored in the flash memory 909 may refer to code stored with a hardware. In an example, to reduce cost and complexity, the wireless device 900 may implement both the central processor 905 and the baseband processor 904 on a single chip.

Figure 10:
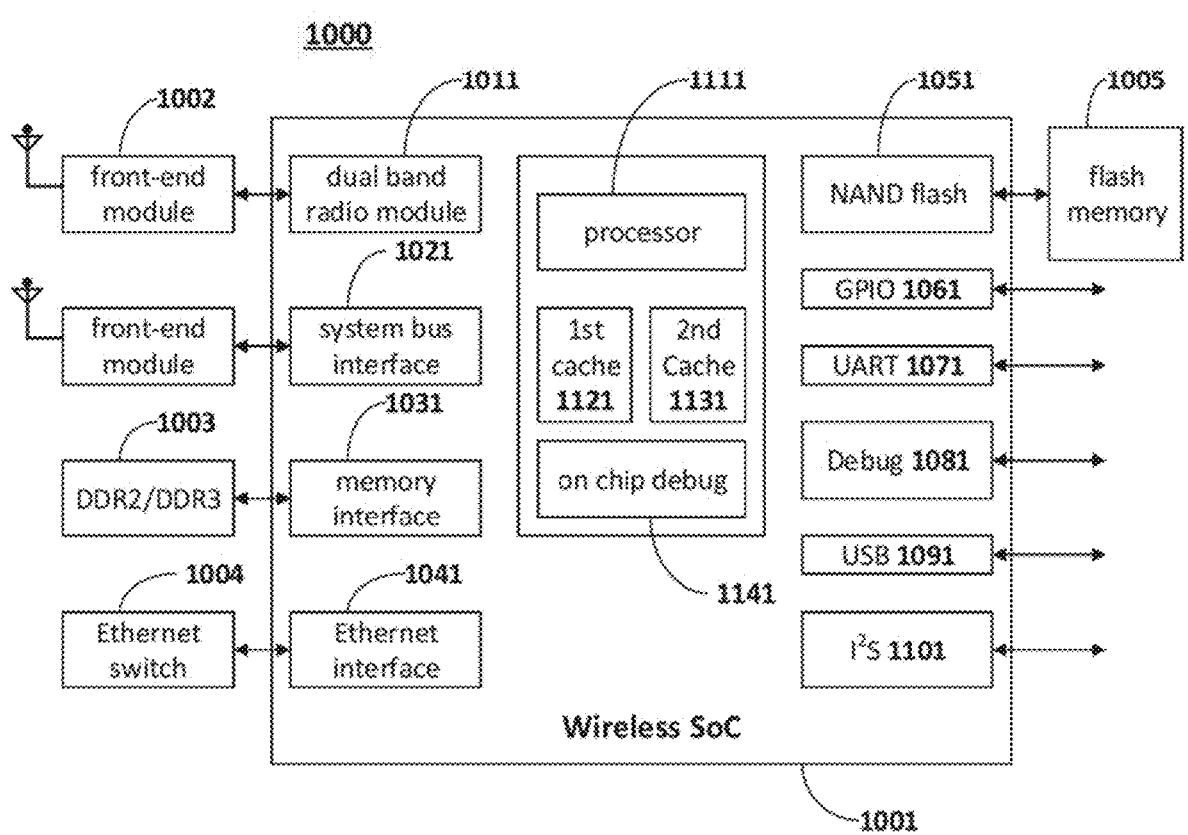
FIG. 10 is a block diagram illustrating a detailed structure of an access point (AP) in accordance with an example of the present disclosure.

FIG. 10 is a block diagram illustrating a detailed structure of an access point 1000 in accordance with an example of the present disclosure. In an example, the access point 1000 may include a wireless system on a chip (SoC) 1001, a front-end module 1002, a memory 1003, an Ethernet switch 1004, and a flash memory 1005.

In an example, the wireless SoC 1001 may integrate two radios, power amplifiers and CPU on a single device. Specifically, the wireless SoC 1001 may include a dual band radio module 1011 having a Real Simultaneous Dual-Band (RSDB) functionality. The RSDB functionality may support 2.4 GHz and 5 GHz radio operation concurrently. The wireless SoC 1001 may include a system bus interface 1021 to connect to the front-end module 1002, and may also include a memory interface 1031 to connect to the memory 1003. The system bus interface 1021 may adopt a PCI Express bus to provide a high-speed serial connection for the wireless SoC 1001. In an example, the wireless SoC 1001 may include an Ethernet interface 1041 connected with the Ethernet switch 1004, and may also include a NAND flash 1051 connected with the flash memory 1005. The Ethernet interface 1041 may be a Reduced Gigabit Media Independent Interface (RGMII).

In an example, the front-end module 1002 may be the circuitry that processes the signal at the original incoming radio frequency (RF) and converts the RF to a lower intermediate frequency (IF). In an example, the memory 1003 may be such as DDR2/DDR3. The flash memory 1005 may be a type of non-volatile storage technology that does not require power to retain data.

In an example, the wireless SoC 1001 may include a General-purpose input/output (GPIO) 1061, a universal asynchronous receiver-transmitter (UART) 1071, a debug 1081, a Universal Serial Bus (USB) 1091, and an Inter-IC Sound (IPS) 1101. The GPIO 1061 is a generic pin on the wireless SoC 1001. The UART 1071 is a computer hardware device for asynchronous serial communication in which the data format and transmission speeds are configurable. The debug 1081 may be a Joint Test Action Group (JTAG) for testing the wireless SoC 1001. The USB 1091 may provide connection, communication, and power supply between the wireless SoC 1001 and other electronic devices, such as keyboards, pointing devices, digital cameras, printers, portable media players, disk drives and network adapters. The PS 1101 may be an electrical serial bus interface used for connecting digital audio devices.

In an example, the wireless SoC 1001 may include a processor 1111, a first cache 1121, a second cache 1131, and an on-chip debug 1141. The first cache 1121 and the second cache 1131 are small memories close to the processor 1111, and can operate faster than the much larger main memory. The on-chip debug 1141 may provide some new way for debugging the processor 1111.

In an example, the flash memory 1005 may store firmware executed by the processor 1111 to perform operations illustrated in such as FIGS. 1-9.

Figure 11:
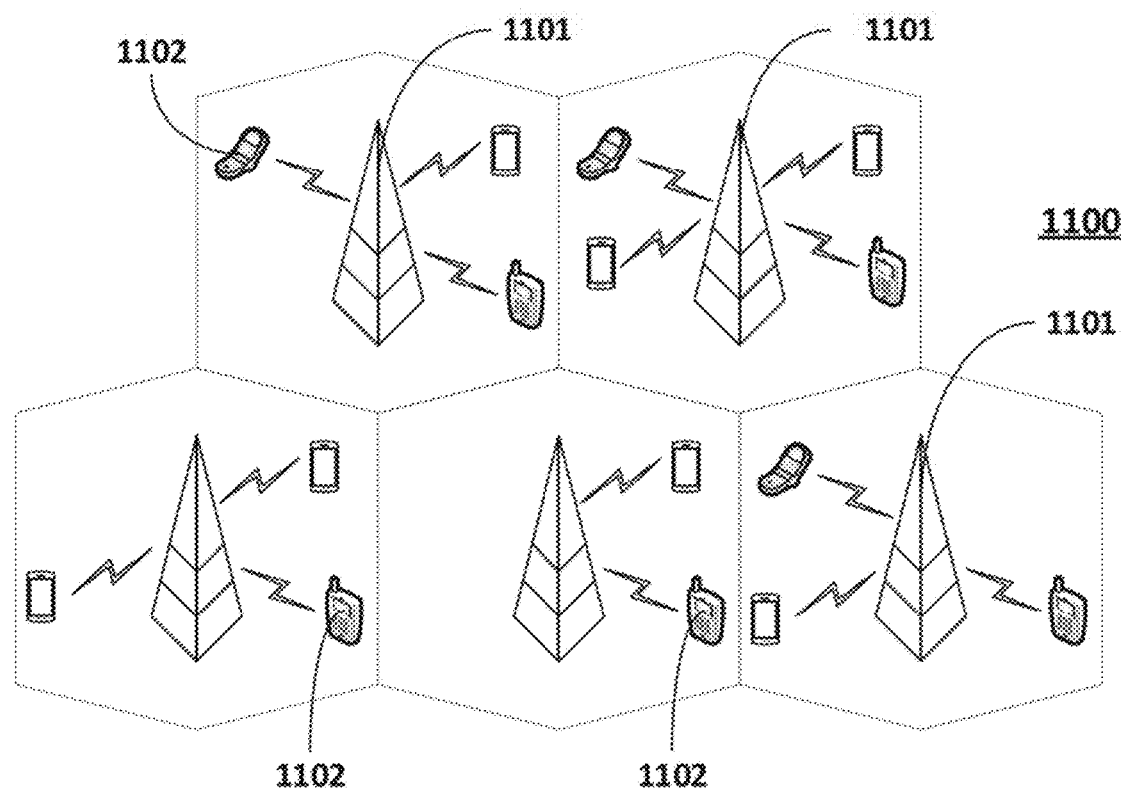
FIG. 11 is a scenario of adjusting a data rate in a cellular network.

FIG. 11 is a scenario 1100 of adjusting a data rate in a cellular network. In the cellular network, there may be a plurality of base stations 1101, each of which may provide radio coverage within a cell. According to the application of the base station 1101, the coverage size of the base station 1101 may vary from a femtocell, a picocell, a microcell, to a macrocell. Mobile stations 1102, such as smart phones, laptops, printers, cameras, and other electronic devices having cellular modules, may communicate with the base stations 1101 to transfer data units within the cellular network. In an example, a base station 1101 may perform operations illustrated in such as FIGS. 1-10 to raise data rates of data units sent to a mobile station 1102. In another example, the mobile station 1102 may perform operations illustrated in such as FIGS. 1-10 to optimize data rates of data units sent to the base station 1101.

Figure 12:
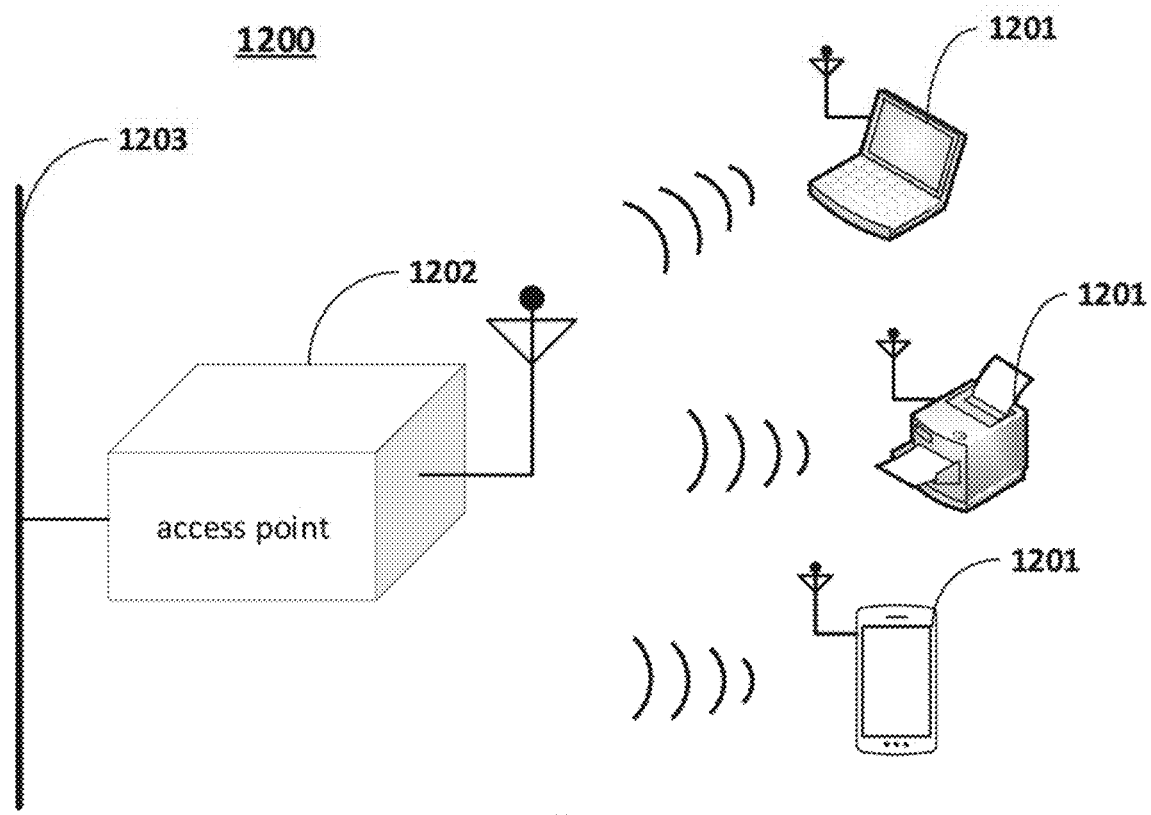
FIG. 12 is a scenario of adjusting a data rate in a wireless local area network (WLAN).

FIG. 12 is a scenario 1200 of adjusting a data rate in a WLAN network. In an example, client stations 1201 may connect to a backbone network 1203 via access points 1202. The client stations 1201 may be computing devices with wireless network interfaces. Typically, the client stations 1201 are battery-operated laptop, or handheld computers, or wireless printers. The access points 1202 may perform the wireless-to-wired bridging function. The backbone network 1203 may relay data units between the access points 1202. In an example, Ethernet is used as the backbone network technology. In an example, an access point 1202 may perform operations illustrated in such as FIGS. 1-10 to adjust data rates of data units sent to a client station 1201. In another example, the client station 1201 may perform operations illustrated in such as FIGS. 1-10 to optimize data rates of data units sent to the access point 1202.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described to best explain the present disclosure and its practical applications, to thereby enable others skilled in the art to best utilize the present disclosure and numerous examples with various modifications as are suited to the particular use contemplated. All the features disclosed in this specification (including any accompanying claims, abstract and drawings), and/or all the elements of any method or process so disclosed, may be combined in any combination, except combinations where at least some of such features and/or elements are mutually exclusive.

What is claimed is:

1. A wireless device, comprising:
   a radio system including an antenna, to receive receiver feedback information, the receiver feedback information being information collected by a receiver relating to receiving status of the receiver;
   a memory; and
   a processor executing instructions stored on the memory to:
   determine whether a level of noises and interferences associated with the receiver exceeds a predefined threshold based on the receiver feedback information;
   in response to determining that the level of noises and interferences associated with the receiver does not exceed the predefined threshold, obtain a revised data error ratio based on an original data error ratio and the receiver feedback information, the original data error ratio being a data error ratio collected by the wireless device; and
   adjust the data rate associated with the receiver according to the revised data error ratio.

2. The wireless device of claim 1, wherein the instructions are to cause the processor to:
   obtain a receiver data error ratio based on an individual data link error counter and a correct unit counter extracted from the receiver feedback information, the individual data link error counter being the number of data units sent from the wireless device at a specific data rate with a data link error, and the correct unit counter being the number of data units correctly received by the receiver;
   compare the receiver data error ratio with the original data error ratio; and
   in response to determining that the receiver data error ratio is smaller than the original data error ratio, calculate the revised data error ratio according to the receiver data error ratio and the original data error ratio.

3. The wireless device of claim 2, wherein the instructions are to cause the processor to:
   obtain a first weight factor according to a statistic window extracted from the receiver feedback information, the statistic window being a time window defining the start and end of counters set at the receiver;
   obtain a second weight factor based on the first weight factor; and
   apply the first weight factor to the receiver data error ratio and apply the second weight factor to the original data error ratio to get the revised data error ratio.

4. The wireless device of claim 1, wherein the instructions are to cause the processor to:
   compare a noise floor extracted from the receiver feedback information with a predefined noise threshold, the noise floor being the sum of noise sources and unwanted signals measured by the receiver; and
   retain the original data error ratio when the noise floor exceeds the predefined noise threshold.

5. The wireless device of claim 1, wherein the instructions are to cause the processor to:
   calculate a physical error ratio according to a physical layer error counter, a received unit counter and a channel utilization percentage extracted from the receiver feedback information, the physical layer error counter being the number of data units received by the receiver with a physical layer error, the received unit counter being the number of data units received by the receiver, and the channel utilization percentage being a percentage of channel medium used at the receiver;
   compare the physical error ratio with a predefined physical error threshold; and
   retain the original data error ratio when the physical error ratio exceeds the predefined physical error threshold.

6. The wireless device of claim 1, wherein the instructions are to cause the processor to:
   calculate a demodulation error ratio according to a total data link error counter, a received unit counter and a channel utilization percentage extracted from the receiver feedback information, the total data link error counter being the number of data units received by the receiver from unknown transmitters at a specific data rate with a data link error, the received unit counter being the number of data units received by the receiver, and the channel utilization percentage being a percentage of channel medium used at the receiver;
   compare the demodulation error ratio with a predefined demodulation error threshold; and
   retain the original data error ratio when the demodulation error ratio exceeds the predefined demodulation error threshold.

7. The wireless device of claim 1, wherein the instructions are further to cause the processor to:
   analyze data units received by the radio system;
   in response to determining that a data unit is correctly received, update a second correct unit counter and a second received unit counter;
   in response to determining that the data unit has a data link error, update the second received unit counter and a second individual data link error counter when a transmitter address of the data unit is available, and update the second received unit counter and a second total data link error counter when the transmitter address of the data unit is not available;
   in response to determining that the data unit has a physical layer error, update a second physical layer error counter; and
   form second receiver feedback information by using the second correct unit counter, the second received unit counter, the second individual data link error counter, the second total data link error counter, and the physical layer error counter.

8. A method comprising:
   receiving, by a transmitter, receiver feedback information, the receiver feedback information being information collected by a receiver relating to receiving status;
   determining whether a level of noises and interferences of the receiver exceeds a predefined threshold according to the receiver feedback information;
   in response to determining that the level of noises and interferences associated with the receiver does not exceed the predefined threshold, obtaining a revised data error ratio according to an original data error ratio and the receiver feedback information, the original data error ratio being a data error ratio collected by the transmitter; and
   adjusting the data rate associated with the receiver according to the revised data error ratio.

9. The method of claim 8, wherein obtaining the revised data error ratio comprises:
   obtaining a receiver data error ratio according to an individual data link error counter and a correct unit counter extracted from the receiver feedback information, the individual data link error counter being the number of data units sent from the transmitter at a specific data rate with a data link error, and the correct unit counter being the number of data units correctly received by the receiver;

comparing the receiver data error ratio with the original data error ratio; and in response to determining that the receiver data error ratio is smaller than the original data error ratio, calculating the revised data error ratio according to the receiver data error ratio and the original data error ratio.

10. The method of claim 8, wherein calculating the revised data error ratio according to the receiver data error ratio and the original data error ratio comprises:

obtaining a first weight factor according to a statistic window extracted from the receiver feedback information, the statistic window being a time window defining the start and end of counters set at the receiver;

obtaining a second weight factor based on the first weight factor; and applying the first weight factor to the receiver data error ratio and applying the second weight factor to the original data error ratio to get the revised data error ratio.

11. The method of claim 8, wherein determining whether the level of noises and interferences of the receiver exceeds the predefined threshold comprises:

calculating a physical error ratio according to a physical layer error counter, a received unit counter and a channel utilization percentage extracted from the receiver feedback information, the physical layer error counter being the number of data units received by the receiver with a physical layer error, the received unit counter being the number of data units received by the receiver, and the channel utilization percentage being a percentage of channel medium used at the receiver;

comparing the physical error ratio with a predefined physical error threshold; and retaining the original data error ratio when the physical error ratio exceeds the predefined physical error threshold.

12. The method of claim 8, wherein determining whether the level of noises and interferences of the receiver exceeds the predefined threshold comprises:

calculating a demodulation error ratio according to a total data link error counter, a received unit counter and a channel utilization percentage extracted from the receiver feedback information, the total data link error counter being the number of data units received by the receiver from unknown transmitters at a specific data rate with a data link error, the received unit counter being the number of data units received by the receiver, and the channel utilization percentage being a percentage of channel medium used at the receiver;

comparing the demodulation error ratio with a predefined demodulation error threshold; and retaining the original data error ratio when the demodulation error ratio exceeds the predefined demodulation error threshold.

13. A non-transitory machine-readable medium comprising instructions that when executed cause a processor to:

determine whether a level of noises and interferences of the receiver exceeds a predefined threshold according to receiver feedback information, the receiver feedback information being information collected by a receiver relating to receiving status;

in response to determining that the level of noises and interferences of the receiver does not exceed the predefined threshold, obtain a revised data error ratio according to an original data error ratio and the receiver feedback information, the original data error ratio being a data error ratio collected by the system on the chip; and adjust the data rate associated with the receiver according to the revised data error ratio.

14. The non-transitory machine-readable medium of claim 13, wherein the instructions cause the processor to:

obtain a receiver data error ratio according to an individual data link error counter and a correct unit counter extracted from the receiver feedback information, the individual data link error counter being the number of data units sent from the system on the chip at a specific data rate with a data link error, and the correct unit counter being the number of data units correctly received by the receiver;

compare the receiver data error ratio with the original data error ratio; and in response to determining that the receiver data error ratio is smaller than the original data error ratio, calculate the revised data error ratio according to the receiver data error ratio and the original data error ratio.

15. The non-transitory machine-readable medium of claim 13, wherein the instructions further cause the processor to:

analyze data units received by the system on the chip;

in response to determining that a data unit is correctly received, update a second correct unit counter and a second received unit counter;

in response to determining that the data unit has a data link error, update the second received unit counter and a second individual data link error counter when a transmitter address of the data unit is available, and update the second received unit counter and a second total data link error counter when the transmitter address of the data unit is not available;

in response to determining that the data unit has a physical layer error, update a second physical layer error counter; and use the second correct unit counter, the second received unit counter, the second individual data link error counter, the second total data link error counter, and the physical layer error counter to form second receiver feedback information.

* * * * *